UNITED STATES PATENT OFFICE.

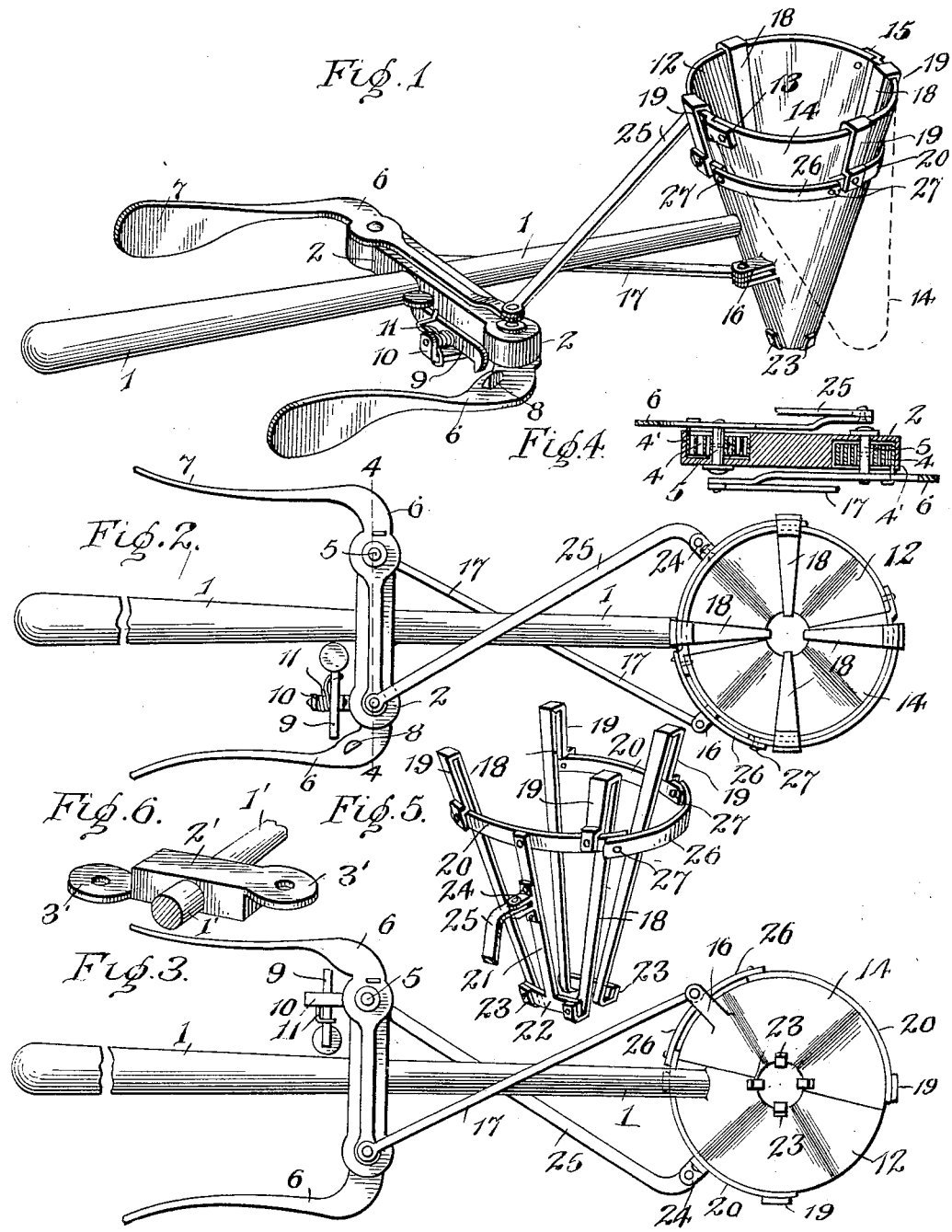

CHARLES N. JAGER AND CASPER J. JAGER, OF BALTIMORE, MARYLAND.

ICE-CREAM-CONE SCOOP.

1,112,802. Specification of Letters Patent. Patented Oct. 6, 1914.

Application filed September 8, 1913. Serial No. 788,690.

*To all whom it may concern:*

Be it known that we, CHARLES N. JAGER and CASPER J. JAGER, citizens of the United States, residing at Baltimore, in the State of Maryland, have invented certain new and useful Improvements in Ice-Cream-Cone Scoops, of which the following is a specification, reference being had therein to the accompanying drawing.

This invention relates to fillers for ice cream cones and the like, and has for its object the production of a simple and efficient means for facilitating the operation of the filler so as to fill the filler with ice cream and allow the ice cream to be deposited from the filler into the cone in its proper shape in order that the ice cream may fit properly within the cone.

Another object of this invention is the production of a simple and efficient means for cleaning the ice cream from the scoop in case the cream should cling to the sides of the scoop.

Other objects and advantages of the present invention will appear throughout the following specification and claims.

In the drawings: Figure 1 is a perspective view of the cone filler, showing the scoop in a closed position. Fig. 2 is a top plan view of the cone filler. Fig. 3 is a bottom plan view of the cone filler. Fig. 4 is a section taken on line 4—4 of Fig. 2. Fig. 5 is a detail perspective of the cleaning frame carried by the scoop of the cone filler. Fig. 6 is a detail perspective of an embodiment of the means for supporting the spring and operating triggers for the ice cream releasing mechanism of the cone filler.

Referring to the drawings by numerals 1 designates a handle which carries a pair of laterally-extending fingers 2 which fingers constitute spring-receiving pockets for supporting the springs 4 carried by the journal pins 5 of the operating angle-levers 6. One angle-lever 6 is placed upon each side of the handle 1, the journal pins of the angle-levers being journaled upon the opposite fingers 2, as is clearly illustrated in Fig. 4. Each of the angle-levers 6 is provided with a wide finger-engaging portion 7 at the rear end thereof for the purpose of facilitating the operation of the angle-levers upon the handle 1 to open the cone filler and at the same time operate the cleaning frame carried by the cone filler.

One of the angle-levers 6 is provided with an integral upwardly-extending knob 8 which is adapted to be engaged by the spring-pressed pawl 9 carried by the bracket 10. This bracket 10 is carried by one of the fingers 2 and constitutes an efficient support for the pawl 9, whereby the pawl 9 will be caused to automatically engage the knob 8 of one of the angle-levers 6 and hold said angle-lever in a set or locked position. A coil spring 11 is mounted upon the bracket 10 and engages the pawl 9 for normally forcing the pawl 9 in engagement with the lug 8 as one of the angle-levers 6 is swung toward the handle 1.

The handle 1 carries the stationary segment 12 of the cone filler and this stationary segment 12 is provided with a projecting ear 13 for pivotally engaging the swinging segment 14 of the cone filler. The swinging segment 14, in like manner, is provided with a projecting ear 15 which engages the stationary segment 12 of the cone filler upon the opposite side to the ear 13 thereby constituting an efficient pivotal connection between the stationary swinging segments of the cone filler. The cone filler, when in a closed position, constitutes a substantially cone-shaped member for the purpose of forming a cone of cream or other substance placed therein. The pivotally-connected segment 14 of the cone filler is provided with a plurality of spaced ears 16 formed integrally therewith and between these spaced ears 16 is pivotally connected a link-rod 17 which link-rod 17 is connected to one of the angle-levers 6 for the purpose of allowing the pivotally-connected segment 14 of the cone filler to be moved to an open position when one of the angle-levers 6 is operated. This link 17 is connected to the angle-lever 6 which carries the knob 8, and which knob is adapted to coöperate with the pawl 9 as above described.

A sheet-metal cleaning frame, as is clearly shown in Fig. 5, is mounted upon the segments 12 and 14 of the cone filler, and this frame comprises a pair of similarly-constructed sections, each section comprising a pair of vertically-extending cleaning bars 18. These cleaning bars 18 are provided with overhanging upper ends 19 which overhang or straddle the upper edge of the segments 12 and 14 of the cone filler. The overhanging ends 19 of the cleaning bars 18 are connected by means of a connecting band 20 and this connecting band supports a substantially inverted T-shaped bar 21. The transversely-extending portion 22 of this T-shaped bar is seated between the upturned ends 23 of the cleaning bars 18. The cleaning bars 18 converge toward the lower ends thereof so as to conform to the shape of the segmental portions of the cone filler. The bar 21 is provided with a bracket-portion 24 and upon this bracket-portion 24 is pivotally mounted a link-member 25, which link-member 25 is connected to one of the angle-levers 6 carried by one of the pins 2 of the handle 1. Two sections of the cleaning frame are connected by means of a connecting band 26, this band being pivotally secured to the sections of the frame by means of pivot pins 27, as is clearly illustrated in Fig. 5, for the purpose of allowing the cones to be spread apart at their lower ends without affecting the cleaning frame. These cleaning sections of the cleaning frame are mounted upon the respective segments of the cone filler and the connecting-link 26 straddles the joint between the two sections of the cone filler for the purpose of allowing the cleaning sections to slide easily over the body of the cone filler. The upturned ends 23 of the cleaning bars 18 also fit over the lower edge of the segments of the cone filler so as to constitute a guide and an efficient means for holding the sections upon the segments of the cone filler.

From the foregoing description it will be seen that a very simple and efficient means has been produced for filling ice cream cones whereby the two segments of the cone filler may be thrown open at the lower end to allow the ice cream to descend in a cone-like form into the ice cream cone, when the lower ends of the cone filler are spread apart as in the position shown in Fig. 1, in dotted lines. Furthermore, it should be understood that the cone filler may be held open by means of the pawl engaging the knob, as illustrated in Fig. 8, and that, if the ice cream should stick within the cone filler the opposite angle-lever 6 may be operated, thereby pushing upon the link 25 and causing the sections of the cleaning frame to oscillate upon the cone filler. The cleaning bars 18 of the cleaning sections are beveled upon their edges so as to present a knife-like form to more easily cut and clean the ice cream from the interior of the cone filler.

As illustrated in Fig. 6, there is shown an embodiment of the invention wherein the handle 1' may be provided with integral laterally-extending portions 2', which portions terminate in flat laterally-extending disks 3' for the purpose of allowing the journal pins 5 and springs 4 to be mounted thereon. This form, as illustrated in Fig. 6, may be used in placing the structure shown in Fig. 4, wherein the springs are incased by the side walls 4', as illustrated in Fig. 4. The structure, as illustrated in Fig. 6, may, however, be used so as to more readily clean the springs in case any ice cream or other substance may accumulate therein.

What is claimed is:

1. An ice cream cone filler comprising a handle, a substantially conical body carried by said handle and comprising a pair of pivotally-connected segments, an operating trigger carried by said handle, a link engaging said trigger and engaging one of said segments for throwing the same to an open position when said trigger is operated, a knob carried by said trigger, a pawl engaging said knob for holding said trigger in a locked position.

2. An ice cream cone filler comprising a handle, a plurality of laterally-extending fingers carried thereby, a plurality of angle-levers pivotally mounted upon said opposite sides of said fingers, a conical body carried by said handle, a cleaning frame carried by said conical body, one of said levers co-operating with said cleaning frame for oscillating the same upon said conical body, and means connected to said conical body and to the other of said angle-levers for throwing said conical body to an open position.

3. An ice cream cone filler of the class described comprising a handle, a plurality of pivotally-mounted, spring-actuated angle-levers carried by said handle, means engaging one of said angle-levers for holding the same in a locked position, a conical body carried by said handle and provided with a pivotally-mounted segment, means connecting said pivotally-mounted segment with said last-mentioned angle-lever whereby said pivotally-mounted segment may be held in an open position when said lever is thrown to a locked position, a cleaning frame carried by said body, and means connecting said cleaning frame to the other of said angle-levers for causing the oscillation of said cleaning frame upon said body when said last-mentioned angle-lever is operated.

4. An ice cream cone filler comprising a substantially conical body, a cleaning frame carried by said body, said body comprising a plurality of pivotally-connected segments, said cleaning frame comprising a plurality of sections, cleaning bars carried by each section and provided with overhanging upper ends and folded lower ends, said overhanging upper and folded lower ends fitting over the edges of said segments and constituting a guide for said cleaning bars, and means for operating said cleaning frame.

5. A device of the class described, comprising a substantially conical body, said body constituting a plurality of segments, a cleaning frame working upon said body, said cleaning frame comprising a plurality of sections, each section comprising a plurality of cleaning bars, each bar provided with an overhanging upper end and a folded lower end working upon the respective upper and lower edges of said segments, a connecting bar engaging the overhanging ends of said cleaning bars, a brace bar engaging said connecting bar and also engaging the lower ends of said cleaning bars, an operating link connected to said brace bar for the purpose of oscillating said sections upon said body, and a connecting band pivotally secured to the transverse bar of each section for connecting said sections together and causing the same to oscillate in unison.

In testimony whereof we hereunto affix our signatures in presence of two witnesses.

CHARLES N. JAGER.
CASPER J. JAGER.

Witnesses:
CHARLES H. RUFFER,
CLEMENT WENDEL.

---

Copies of this patent may be obtained for five cents each, by addressing the "Commissioner of Patents, Washington, D. C."